US012265847B2

(12) United States Patent
Peng

(10) Patent No.: US 12,265,847 B2
(45) Date of Patent: Apr. 1, 2025

(54) CONCURRENT DUPLICATED SUB PROCESS CONTROL IN A WORKFLOW ENGINE

(71) Applicant: SAP SE, Walldorf (DE)

(72) Inventor: Yang Peng, Pleasanton, CA (US)

(73) Assignee: SAP SE, Walldorf (DE)

( * ) Notice: Subject to any disclaimer, the term of this patent is extended or adjusted under 35 U.S.C. 154(b) by 472 days.

(21) Appl. No.: 17/879,413

(22) Filed: Aug. 2, 2022

(65) Prior Publication Data
US 2024/0045714 A1 Feb. 8, 2024

(51) Int. Cl.
G06F 9/48 (2006.01)
G06F 9/54 (2006.01)
G06F 16/901 (2019.01)
G06Q 10/0633 (2023.01)

(52) U.S. Cl.
CPC ............ *G06F 9/4881* (2013.01); *G06F 9/546* (2013.01); *G06F 16/9024* (2019.01); *G06Q 10/0633* (2013.01)

(58) Field of Classification Search
None
See application file for complete search history.

(56) References Cited

U.S. PATENT DOCUMENTS

| | | | |
|---|---|---|---|
| 10,248,547 B2 | 4/2019 | Peng et al. | |
| 10,503,572 B2 | 12/2019 | Peng et al. | |
| 10,565,089 B2 | 2/2020 | Yu et al. | |
| 10,678,613 B2 * | 6/2020 | Frech | G06F 8/36 |
| 10,719,431 B2 | 7/2020 | Peng et al. | |
| 10,860,925 B2 * | 12/2020 | Tucker | G06F 9/5038 |
| 10,909,484 B2 * | 2/2021 | Palmer | G06Q 10/06316 |
| 10,963,451 B2 | 3/2021 | Peng | |
| 11,301,221 B2 | 4/2022 | Peng | |

(Continued)

FOREIGN PATENT DOCUMENTS

| | | | | |
|---|---|---|---|---|
| WO | WO 2023133585 A1 * | 7/2023 | ............. | G06F 9/546 |
| WO | WO 2024065778 A1 * | 4/2024 | ......... | G06F 16/9024 |

OTHER PUBLICATIONS

Workflowpatterns.com [Online], "Pattern 36 (Dynamic Partial Join for Multiple Instances)" 2010, [retrieved on May 17, 2022], retrieved from : URL <http://www.workflowpatterns.com/patterns/control/new/wcp36.php>, 4 pages.

*Primary Examiner* — Charles E Anya
(74) *Attorney, Agent, or Firm* — Fish & Richardson P.C.

(57) ABSTRACT

The present disclosure involves systems, software, and computer implemented methods for concurrent duplicated sub process control in a workflow engine. One example method includes executing a sub process of a workflow process using an instance of a node that represents the sub process. After executing the sub process, a determination is made as to whether the node is a join node that has multiple direct predecessor nodes in a graph of the workflow process. If the node is a join node, dependent nodes of the join node are identified for which traversal of the graph from a dependent node passes through the join node. A set of active dependent node instances of the dependent nodes are identified and a determination is made as to whether to wait for completion of any particular dependent node instances or if workflow execution can continue beyond the join node.

20 Claims, 10 Drawing Sheets

(56) References Cited

U.S. PATENT DOCUMENTS

| | | | |
|---|---|---|---|
| 2011/0231849 A1* | 9/2011 | Saha | G06F 9/5038 |
| | | | 711/E12.017 |
| 2015/0161536 A1* | 6/2015 | Mikheev | G06F 16/283 |
| | | | 705/7.27 |
| 2016/0070589 A1* | 3/2016 | Vermeulen | G06F 9/466 |
| | | | 711/153 |
| 2020/0193037 A1 | 6/2020 | Peng | |
| 2020/0272433 A1* | 8/2020 | Wang | G06F 8/30 |
| 2020/0326999 A1* | 10/2020 | Frech | G06F 16/9024 |
| 2021/0089452 A1 | 3/2021 | Peng | |
| 2021/0124792 A1 | 4/2021 | Peng | |
| 2021/0182732 A1 | 6/2021 | Peng | |
| 2022/0006706 A1* | 1/2022 | Patodia | H04L 67/101 |
| 2024/0168758 A1* | 5/2024 | Howard | G06F 9/45508 |
| 2024/0211784 A1* | 6/2024 | Rosendahl | G06N 7/01 |

* cited by examiner

```
                         ┌302
process = loaddata -
         (    ┌304
           save, ┌307     ┌308
     306 ┌ transform * trigger
         ┤        - (img_proc,info_proc) - report
         ) - finish  ╲          ╲         ╲
                ╲    310        312       314
                316
```

300    FIG. 3

CONCURRENT DUPLICATED SUB PROCESS CONTROL IN A WORKFLOW ENGINE

TECHNICAL FIELD

The present disclosure relates to computer-implemented methods, software, and systems for concurrent duplicated sub process control in a workflow engine.

BACKGROUND

A workflow process can include a repeatable set of steps for accomplishing a certain task. A workflow process can be represented using a graph. Each node of the graph can represent a step in a workflow process. Nodes can be connected in the graph by directed edges. A first node connected to a second node with a directed edge can indicate that a process step represented by the second node follows a process step represented by the first node.

SUMMARY

The present disclosure involves systems, software, and computer implemented methods for concurrent duplicated sub process control in a workflow engine. An example method includes: receiving a directed acyclic graph (DAG) that represents a workflow process, wherein the DAG includes nodes that each graphically represent a sub process of the workflow process, wherein each node has a depth value, wherein node depth values represent sub process generations of instances of respective nodes, wherein a depth of a succeeding first node that is connected in the DAG to a preceding second node is one greater than a depth of the preceding second node when the preceding second node is directly connected to at least one other succeeding node or the preceding second node is a system-generated node that represents a merge or iteration operation of the workflow process, wherein execution of the workflow process includes multiple, parallel instantiations of at least one sub process, and wherein an instance of a given node corresponds to a respective instantiation of a sub process corresponding to the given node; and executing the workflow process, including executing a first sub process for a first node, wherein executing the first sub process for the first node comprises: activating a first instance of the first node; generating a first identifier array for the first instance of the first node, wherein the first identifier array for the first instance of the first node comprises an array of batch identifiers that each indicate a relative creation time of one or more node instances, and wherein the first identifier array includes a batch identifier for a first batch corresponding to the first instance of the first node at a first index of the first identifier array corresponding to the depth of the first node; executing the first sub process using the first instance of the first node; after executing the first sub process, determining whether the first node is a join node, wherein the first node is a join node if the first node has multiple direct predecessor nodes in the DAG; in response to determining that the first node is not a join node, identifying a second node that is a successor node to the first node and executing a second sub process of the workflow process that corresponds to the second node; in response to determining that the first node is a join node: identifying dependent nodes in the DAG that are graphical dependents of the join node, wherein a given node is a graphical dependent node of the join node if traversal of the DAG from the given node to an end of the DAG passes through the join node; identifying a set of active dependent node instances of the dependent nodes; and determining whether to wait for completion of a first dependent node instance based on comparing the first identifier array of the first instance of the first node to a second identifier array of the first dependent node instance.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 3 illustrates an example process definition for an example workflow process.

DETAILED DESCRIPTION

To handle complex workflow processes, a desired goal can be to share context information between a main process and workflow sub processes. For example, a workflow designer may desire to design a workflow process in which credentials, resources, or other contextual information is shared across workflow execution nodes. In prior solutions, invoked sub processes may have managed their own sub process state information and only communicated a sub processing result to a parent process. With a workflow synchronization solution described herein, all sub processes of a process tree can be managed as one process. As described below, providing shared contextual information in a single process can enable implementation of workflow optimizations for efficiently handling support for parallel, duplicated sub processes. For example, the workflow synchronization solution can be used to manage active node transition based on runtime instance dependencies. For example, the workflow synchronization solution can use identifier arrays of active node instances to determine which (if any) active node instances a particular node needs to wait for before transitioning to a next node.

The workflow synchronization solution, therefore, provides a generic model for concurrent/duplicated sub process control and synchronization that can be applied to different workflow processes. Accordingly, a workflow engine can efficiently manage both design time dependencies (e.g., as reflected in a graph of a workflow) and runtime dependencies when multiple instances of workflow nodes are instantiated. Without the solution described herein, a given node instance would unnecessarily need to wait for completion of other node instances that have no runtime dependencies with the given node instance. Such unnecessary waiting for instance completion would result in longer processing time of workflow execution as compared to the workflow synchronization solution described herein.

Figure 1:
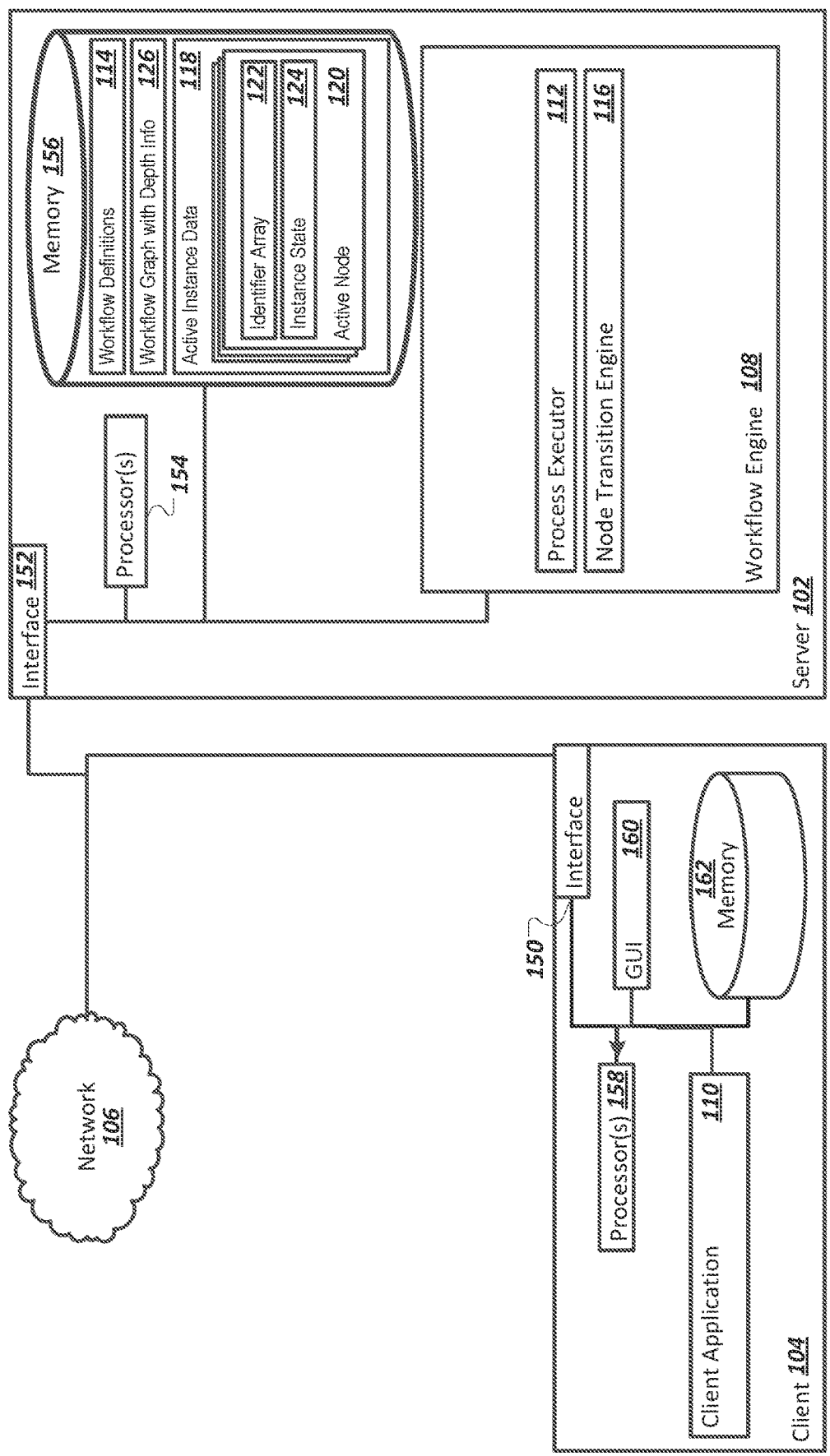
FIG. 1 is a block diagram illustrating an example system for concurrent duplicated sub process control in a workflow engine.

FIG. 1 is a block diagram illustrating an example system 100 for concurrent duplicated sub process control. Specifically, the illustrated system 100 includes or is communicably coupled with a server 102, a client device 104, and a network 106. Although shown separately, in some implementations, functionality of two or more systems or servers may be provided by a single system or server. In some implementations, the functionality of one illustrated system, server, or component may be provided by multiple systems, servers, or components, respectively. The server 102 can be a workflow server or system, for example.

The server 102 includes a workflow engine 108. The workflow engine 108 can execute workflow processes. A workflow process can be executed in response to a request from a client application 110, for example, and/or in response to an internal request initiated within the server 102. In further detail, a process executor 112 of the workflow engine 108 can execute workflow processes based on workflow definitions 114. The process executor 112 can execute sub processes of a workflow process. As described above, a workflow process can be represented by a workflow graph, with sub processes represented as different respective nodes of the graph.

A node transition engine 116 of the workflow engine 108 can determine, when a particular sub process instance corresponding to a workflow node has finished, whether the process executor 112 should proceed to a next node of the workflow graph (e.g., where proceeding to a next node can include initiating execution of the sub process which is represented by the node). The workflow engine 108 (and in particular, the node transition engine 116), can support multiple, parallel instantiations of each sub process of the workflow process. Two instantiations of a sub-process can be considered to be parallel instantiations if execution time of the two instantiations at least partially overlap.

The node transition engine 116 can determine whether to transition to a next node based on identifier arrays of active node instances that are stored in active instance data 118. For example, the active instance data 118 includes, for an example active node instance 120, an identifier array 122 (e.g., along with other instance state data 124). The identifier array 122 can store batch identifiers that each indicate a relative creation time of a batch of one or more node instances. Batch identifiers can increase in value as execution of the workflow progresses (e.g., so that later created batches on or more instances have larger batch identifiers than earlier created batches of one or more instances). If two node instances of different nodes are instantiated at a same time from a same predecessor node, the two nodes can have a same batch identifier. Different approaches can be used to generate batch identifiers. For example, batch identifiers can be generated based on a global counter (e.g., for the workflow engine 108), a per-workflow instance counter, or a per-node counter. An identifier array 122 can be created for a node instance when the node instance is created. The identifier array 122 for a node instance can be modified to insert a new batch identifier for the node instance at an index in the identifier array 122 that corresponds to a depth value of the node of the node instance.

Depth values can be determined from workflow graph and depth information 126. For example, a pre-processing step can include generation of a directed acyclic graph (DAG) that represents a workflow process defined by a workflow definition 114. The DAG can include nodes that each graphically represent a sub process of the workflow process.

As described in more detail below, for some workflow processes, generation of the DAG can include identification and insertion of system-generated nodes that represent merging or joining of processing, such as if a particular sub process of the workflow process includes looping or iteration. In some cases, a system generated node is referred to as a join node and the join node can be included in the DAG with multiple incoming nodes. As described below, the node transition engine 116 can determine whether to transition to a next node after a join node, or to wait for one or more other active node instances (which may be referred to as earlier generations of node instances) based on comparing an identifier array of the join node instance to identifier arrays of the earlier generations of node instances.

After the DAG is generated, a static depth value of each node can be calculated from static information in the DAG. Each node can have a depth value that can represent, at runtime, a generation of instances of the node with respect to generations of instances of other nodes. Depth values that represent generations can be integer values that start at zero. For example, a starting node of the DAG can have a depth of zero. Depth values of other nodes can be determined by traversing the DAG and determining whether a depth incrementing condition applies to a given node that can result in the node having a depth value one greater than a preceding node in the DAG. A depth incrementing condition for a node can include the node being part of a fork (e.g., split) from a preceding node or the preceding node being a system-generated node that represents a merge or iteration operation of the workflow process. Further details of node depth calculation using a graphical example and depth calculation rules are provided below.

Each identifier array of an instance of a node can have a number of elements that corresponds to a maximum depth value of nodes in the DAG. For example, if a maximum depth of nodes in a DAG is two, each node instance can have, at run time, an identifier array that includes two elements. As described in more detail below, identifier array element values can correspond to batch identifiers, where each batch identifier identifies a batch of node instances that have been activated from a same predecessor node.

After the process executor 112 has executed processing for a given node instance, the node transition engine 116 can determine whether the process executor 112 can begin execution of an instance of a next node (e.g., where the next node follows the given node in the workflow graph) or whether the process executor 112 should wait for completion of processing of any other active node instances. If the given node instance is not a join node instance (e.g., the node only has one incoming node in the graph), the node transition engine 116 can determine that the process executor 116 can start processing of a next node. If the given node instance is a join node instance, the node transition engine 116 can perform a check to determine if processing of the next node can begin.

For example, the node transition engine 116 can identify dependent nodes in the DAG that are graphically dependent on the join node. A given node can be considered to be a dependent node of the join node if traversal of the DAG from the given node to an end of the DAG passes through the join node. The node transition engine 116 can determine if there are any active dependent node instances of the dependent nodes. The node transition engine 116 can determine, when a join node instance has completed, whether the process executor 112 should wait for completion of a given dependent node instance by comparing an identifier array of a given active dependent node instance to an identifier array of the join node instance.

For example, for a given active dependent node instance, the node transition engine 116 can compare the identifier array of the join node instance to the identifier array of the active dependent node instance by comparing elements of the identifier array of the active dependent node instance to corresponding elements of the identifier array of the join node instance at index values up to and including an index that corresponds to the depth of the join node. For example, the node transition engine 116 can determine that the process executor 112 is to wait for completion of the given active dependent node instance if all compared elements of the identifier array of the given active node instance match corresponding compared elements of the identifier array of the join node instance. If all compared elements match, the given active dependent node instance can be considered to be a runtime dependency of the join node instance, and the process executor 112 can wait for completion of the given active node instance before proceeding past the join node. If not all compared identifier array elements compared between the active dependent node instance and the join node instance match, the node transition engine 116 can determine that the given active dependent node instance is not a runtime dependency of the join node instance. Similar identifier array checks can be performed for other active dependent node instances. If no active dependent node instances are a runtime dependency of the join node instance, the node transition engine 116 can determine that the process executor 112 can advance past the join node (e.g., for a batch that is associated with the join node instance).

As used in the present disclosure, the term "computer" is intended to encompass any suitable processing device. For example, although FIG. 1 illustrates a single server 102, and a single client device 104, the system 100 can be implemented using a single, stand-alone computing device, two or more servers 102, or two or more client devices 104. Indeed, the server 102 and the client device 104 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 102 and the client device 104 may be adapted to execute any operating system, including Linux, UNIX, Windows, Mac OS®, Java™, Android™, iOS or any other suitable operating system. According to one implementation, the server 102 may also include or be communicably coupled with an e-mail server, a Web server, a caching server, a streaming data server, and/or other suitable server.

Interfaces 150 and 152 are used by the client device 104 and the server 102, respectively, for communicating with other systems in a distributed environment—including within the system 100—connected to the network 106. Generally, the interfaces 150 and 152 each comprise logic encoded in software and/or hardware in a suitable combination and operable to communicate with the network 106. More specifically, the interfaces 150 and 152 may each comprise software supporting one or more communication protocols associated with communications such that the network 106 or interface's hardware is operable to communicate physical signals within and outside of the illustrated system 100.

The server 102 includes one or more processors 154. Each processor 154 may be a central processing unit (CPU), a blade, an application specific integrated circuit (ASIC), a field-programmable gate array (FPGA), or another suitable component. Generally, each processor 154 executes instructions and manipulates data to perform the operations of the server 102. Specifically, each processor 154 executes the functionality required to receive and respond to requests from the client device 104, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 includes memory 156. In some implementations, the server 102 includes multiple memories. The memory 156 may include any type of memory or database module and may take the form of volatile and/or non-volatile memory including, without limitation, magnetic media, optical media, random access memory (RAM), read-only memory (ROM), removable media, or any other suitable local or remote memory component. The memory 156 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102.

The client device 104 may generally be any computing device operable to connect to or communicate with the server 102 via the network 106 using a wireline or wireless connection. In general, the client device 104 comprises an electronic computer device operable to receive, transmit, process, and store any appropriate data associated with the system 100 of FIG. 1. The client device 104 can include one or more client applications, including the client application 110. A client application is any type of application that allows the client device 104 to request and view content on the client device 104. In some implementations, a client application can use parameters, metadata, and other information received at launch to access a particular set of data from the server 102. In some instances, a client application may be an agent or client-side version of the one or more enterprise applications running on an enterprise server (not shown).

The client device 104 further includes one or more processors 158. Each processor 158 included in the client device 104 may be a central processing unit (CPU), an application specific integrated circuit (ASIC), a field-programmable gate array (FPGA), or another suitable component. Generally, each processor 158 included in the client device 104 executes instructions and manipulates data to perform the operations of the client device 104. Specifically, each processor 158 included in the client device 104 executes the functionality required to send requests to the server 102 and to receive and process responses from the server 102.

The client device 104 is generally intended to encompass any client computing device such as a laptop/notebook computer, wireless data port, smart phone, personal data assistant (PDA), tablet computing device, one or more processors within these devices, or any other suitable processing device. For example, the client device 104 may comprise a computer that includes an input device, such as a keypad, touch screen, or other device that can accept user information, and an output device that conveys information associated with the operation of the server 102, or the client device 104 itself, including digital data, visual information, or a GUI 160.

The GUI 160 of the client device 104 interfaces with at least a portion of the system 100 for any suitable purpose, including generating a visual representation of the client application 110. In particular, the GUI 160 may be used to view and navigate various Web pages, or other user interfaces. Generally, the GUI 160 provides the user with an efficient and user-friendly presentation of business data provided by or communicated within the system. The GUI 160 may comprise a plurality of customizable frames or views having interactive fields, pull-down lists, and buttons operated by the user. The GUI 160 contemplates any suitable graphical user interface, such as a combination of a generic web browser, intelligent engine, and command line interface (CLI) that processes information and efficiently presents the results to the user visually.

Memory 162 included in the client device 104 may include any memory or database module and may take the form of volatile or non-volatile memory including, without limitation, magnetic media, optical media, random access memory (RAM), read-only memory (ROM), removable media, or any other suitable local or remote memory component. The memory 162 may store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 104.

There may be any number of client devices 104 associated with, or external to, the system 100. For example, while the illustrated system 100 includes one client device 104, alternative implementations of the system 100 may include multiple client devices 104 communicably coupled to the server 102 and/or the network 106, or any other number suitable to the purposes of the system 100. Additionally, there may also be one or more additional client devices 104 external to the illustrated portion of system 100 that are capable of interacting with the system 100 via the network 106. Further, the term "client", "client device" and "user" may be used interchangeably as appropriate without departing from the scope of this disclosure. Moreover, while the client device 104 is described in terms of being used by a single user, this disclosure contemplates that many users may use one computer, or that one user may use multiple computers.

Figure 2:
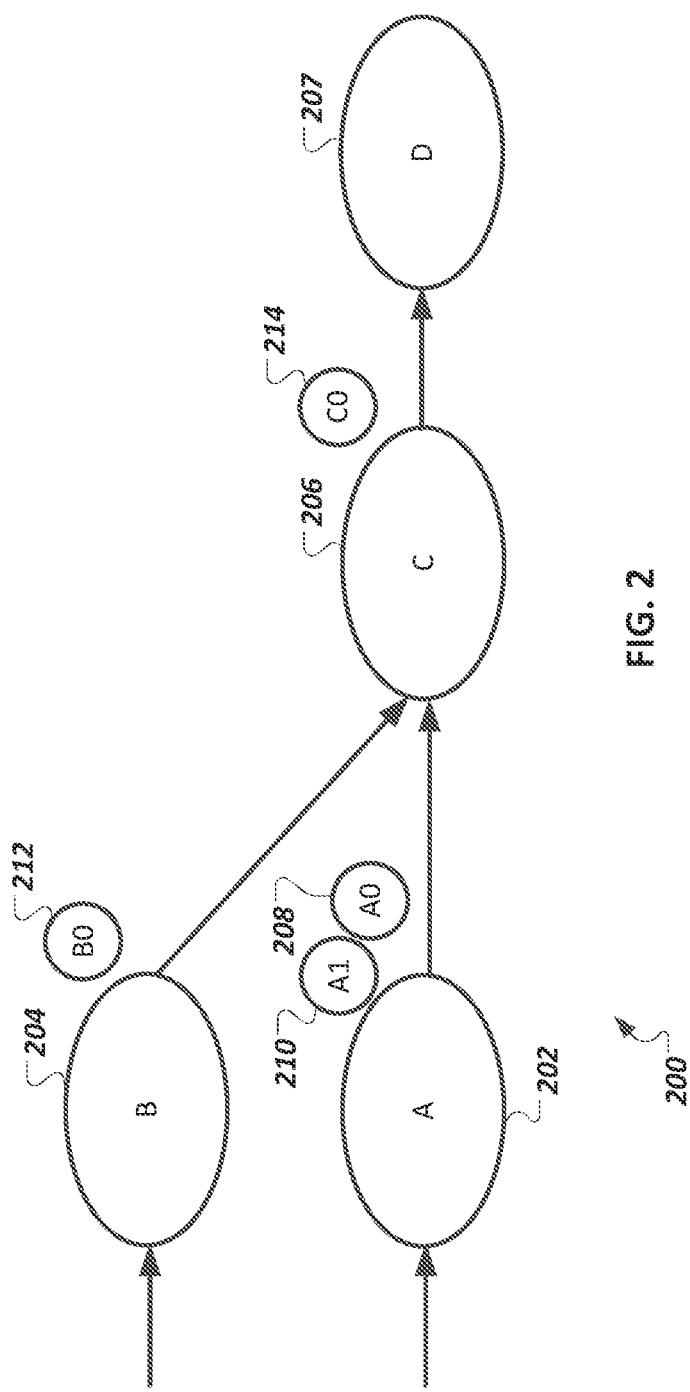
FIG. 2 is a diagram that illustrates node dependency.

FIG. 2 is a diagram 200 that illustrates node dependency. A node A 202, a node B 204, a node C 206, and a node D 207 are included in a graph that represents a workflow process. As described above, each node can graphically represent a respective sub process of a workflow process. The node C 206 can be considered to be a join node due to having multiple incoming arrows in the graph. With a workflow system that supports multiple node instances that can run in parallel, different instances of a same node may be active at a given point in time. For instance, in the example of FIG. 2, instances A0 208 and A1 210 are active for the node A 202 and an instance B0 212 is active for the node B 204. Additionally, an instance C0 214 is active for the node C 206. An instance of a node can refer to an active instantiation of the workflow sub-process that is represented by the node.

Processing of a join node instance (e.g., the instance C0 214) by a workflow engine can include the workflow engine determining if the join node instance has to wait for any instances of dependent nodes of the join node before transitioning to a next node (e.g., the node D 207). A node can be considered a dependent of a join node if, in a graph of the workflow process, the node has to pass through the join node to reach the end of the graph. For instance, the node A 202 and the node B 204 can be considered dependent nodes of the node C 206. A node instance can be considered a dependent instance of a join node instance if the join node instance must wait for the node instance before transitioning to a next node.

Because multiple node instances of a given node can be running in parallel, the node C 206 may not, without further configuration, know which instances of dependent nodes a particular instance of the node C 206 needs to wait for. For example, the instance C0 214 may actually need to wait on some but not all of the instances A0 208, A1 210, and B0 212. As described below, the workflow system can use propagation and testing of instance identifier arrays to determine which dependent instance(s) a join node instance may need to wait on before the workflow process advances to a next workflow step.

FIG. 3 illustrates an example process definition 300 for a process 302. The process 302 is a "loaddata" process that loads data from a system and then splits into two parallel processes. The two parallel processes include a save process 304 and a transform process 306. The save process 304 has a single save step. The transform process 306 includes a transform step 307 that will transform data into subsets and a trigger 308 sub process to trigger a sub process for each subset. The sub process for a subset runs two parallel steps—1) an img_proc process 310 that processes an image in the subset and 2) an info_proc process 312 that processes text information in the subset. When the image and text sub processes are done for a subset, a reporting process 314 is invoked to report results for the current subset. When all subsets have completed, a finish process 316 is executed to perform checks for the save process 304 and the transform process 306 and end the process 302.

Figure 4:
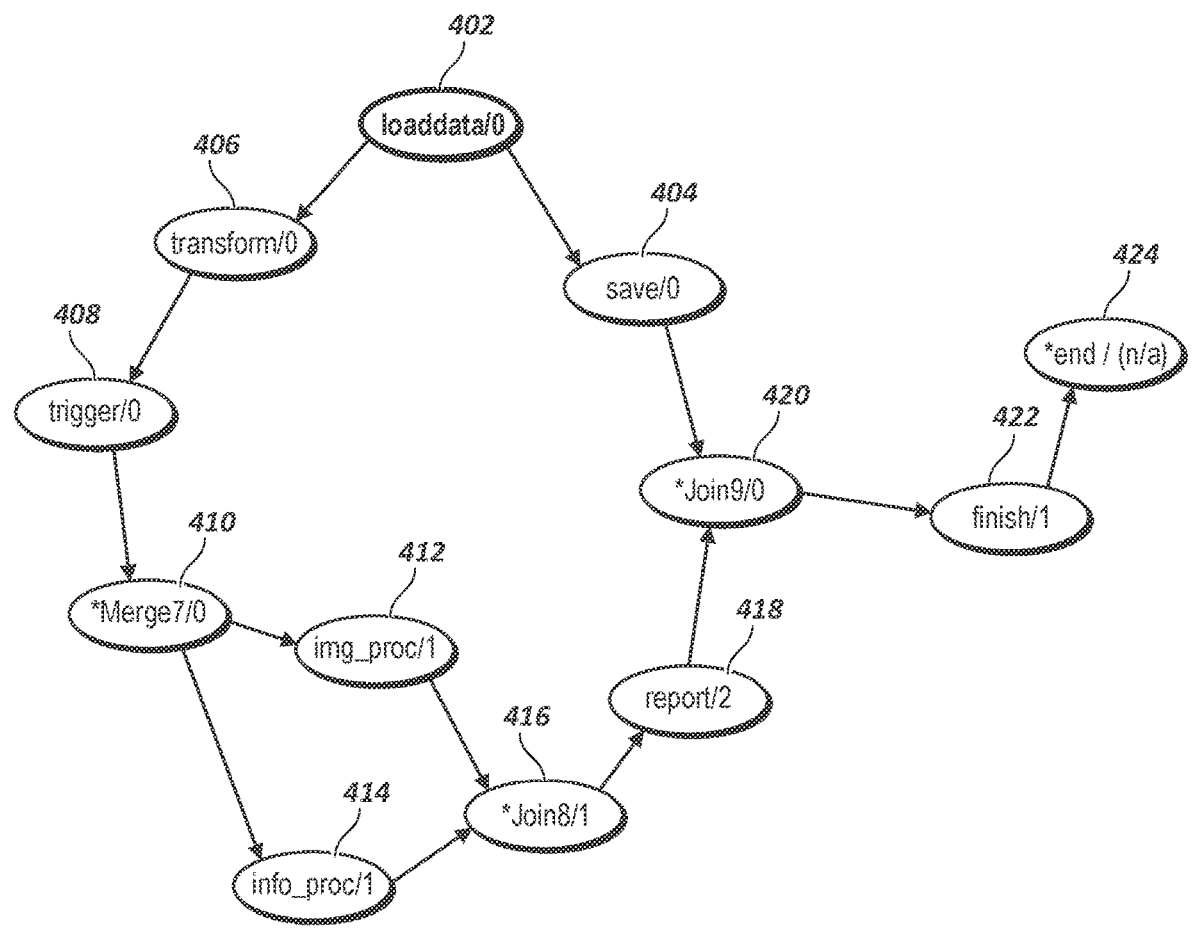
FIG. 4 illustrates an example directed acyclic graph for an example workflow process.

FIG. 4 is a graph 400 that represents a workflow process. The graph 400 is a DAG (Directed Acyclic Graph) that represents the process 302 described above with respect to FIG. 3. The graph 400 includes nodes to represent the process 302, sub processes of the process 300, and intermediate processing such as merging, splitting, or joining of intermediate results. Each node of the graph 400 has an integer depth value (annotated on each node after a "/" character).

Depth of a node can be calculated using a set of depth calculation rules. For example, a first depth calculation rule can specify that if a node does not have an incoming node (e.g., a starting node), the depth is zero. A second depth calculation rule can specify that a join node (e.g., a node with multiple incoming nodes) can have a depth equal to a minimum of the incoming nodes' depths. A third depth calculation rule can specify that a non-join node (e.g., a node with one incoming node) can have a depth equal to the incoming node's depth except for a case in which the incoming node is a join node (or a system-generated merge node) where the non-join node can have a depth of one more than the incoming node's depth.

In the graph 400, a loaddata node 402 with a depth of zero corresponds to the process 302 itself. A save node 404 with a depth of zero represents the save process 304. A transform node 406 with a depth of zero represents the transform step 307. A trigger node 408 with a depth of zero represents the trigger sub process 308. A merge node 410 with a depth of zero represents a merging of the results of the triggered sub processes. The merge node 410 is a system-generated merge node that represents aggregation of results of the processing of the sets of data by the trigger sub process 308. The merge node 410, although not having multiple incoming nodes like a join node, can be handled, with respect to calculation of node depth, in a same manner as a join node. For example, an img_proc node 412 with a depth of one corresponds to the img_proc process 310 and an info_proc node 414 with a depth of one corresponds to the info_proc process 312. The img_proc node 412 and the info_proc node 414 have a depth value of one greater than the merge node 410 based on the third depth calculation rule described above (e.g., a non-join node following a join node can have a depth value one greater than the join node). A join node 416 with a depth of one corresponds to a combining of results of image and text processing for a batch before the batch is reported. The depth value of one for the join node 416 can be calculated based on the second depth calculation rule (e.g., a depth of a join node can be determined as a minimum of the incoming nodes' depth values (e.g., a minimum of one and one (e.g., one), in this example). A report node 418 with a depth of two corresponds to the reporting process 314. The depth of two of the report node 418 can be determined using the third depth calculation rule (e.g., a non-join node following a join node can have a depth value one greater than the join node). A join node 420 with a depth of zero corresponds to a joining of results of the parallel save process 304 and transform process 306. The depth value of zero for the join node 420 can be calculated based on the second depth calculation rule (e.g., a minimum of the incoming nodes' depth values (e.g., a minimum of zero and two (e.g., zero), in this example). A finish node 422 with a depth of one corresponds to the finish process 316. The depth of one of the finish node 422 can be determined using the third depth calculation rule An end node 424 represents the end of the process 302. The end node 424 can be a system generated node that is a marker node that marks the end of the workflow process. In some implementations, the end node 424 can be given a different depth (e.g., two) than its predecessor node (e.g., the finish node 422). However, since execution of the workflow process ends when an instance of the finish node 422 transitions to the end node 424, the depth of the end node 424 is not used (e.g., as illustrated by a "n/a" for the depth of the node 424). The graph 400 has a maximum depth value of two. As described in more detail below, the maximum depth value of a graph that represents a process can be used to determine the size of identifier arrays that are generated for each node instance.

Figure 5:
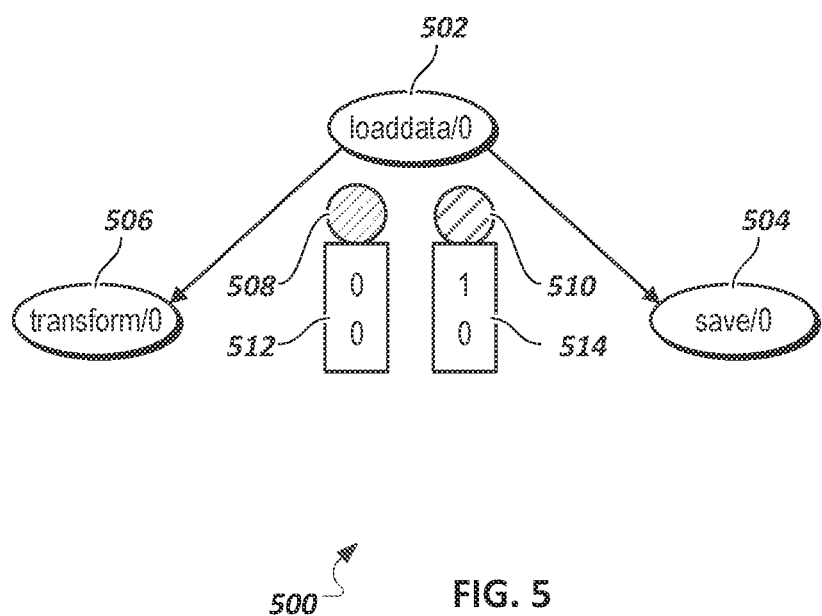
FIGS. 5 to 9 illustrate execution of portions of an example workflow process.

FIG. 5 is a diagram 500 that illustrates runtime execution of multiple instances of a workflow sub process. The diagram 500 includes a portion of the graph 400 (e.g., a static DAG). For example, nodes 502, 504, and 506 correspond to the nodes 402, 404, and 406 of FIG. 4, respectively. As mentioned, a workflow engine can support multiple instances of a workflow sub process within a same workflow instance. FIG. 5 illustrates, along with the static DAG, two example parallel runtime instantiations of the loaddata process that is represented by the node 502. For example, a first symbol 508 and a second symbol 510 represent the first and second runtime instances of the node 502, respectively. When an instance is created, an identifier array can be generated for the instance. For example, an identifier array 512 and an identifier array 514 are generated for the first instance and the second instance of the node 502, respectively. Each identifier array can have a size equal to the maximum depth of the DAG that represents the process. For example, a maximum depth of the nodes in the graph 400 is two, so both the identifier array 512 and the identifier array 514 (and other identifier arrays discussed below) can have two elements. Visually in FIG. 5, the $0^{th}$ index is shown above the $1^{st}$ index in each identifier array 512 and 514. Thus the identifier array 512 has a value 0 stored in its $0^{th}$ index while identifier array 514 has a value 1 stored in its $0^{th}$ index. In some implementations, identifier array elements at indices greater than a depth value of the node, are set to a value of zero. Referring again to FIG. 5, both $1^{st}$ indexes of identifier arrays 512 and 514 have the value 0 stored therein as the depth value of loaddata node 502 is 0. It should also be noted that while only the digits 0 and 1 are shown as stored values in identifier arrays 512 and 514, other digits such as 2, 3, 4, etc. may be stored in identifier arrays as well depending on the number of instances of any such node are created.

The identifier array for a node instance can include, at an index corresponding to the depth of the node, a batch identifier which identifies a batch associated with the node instance. A batch can represent instances created from a same preceding node instance. For example, the depth of the node 502 is zero, so the identifier arrays 512 and 514 can each include a batch identifier at index zero. For example, the first instance of the node 502 (illustrated by the symbol 508) has a batch identifier of zero, so the identifier array 512 has a zero value at the zero index of the identifier array 512. The second instance of the node 502 (illustrated by the symbol 510) has a batch identifier of one, so the identifier array 514 has a one value at the zero index of the identifier array 514. The elements of the identifier arrays 512 and 514 at index one are shown here as being set to zero. As described below, for other nodes for which instances are subsequently created (e.g., the node 504 and/or the node 506), an identifier array can be copied (e.g., cloned) from an instance of a preceding node (and in some cases, modified after cloning).

Figure 6:
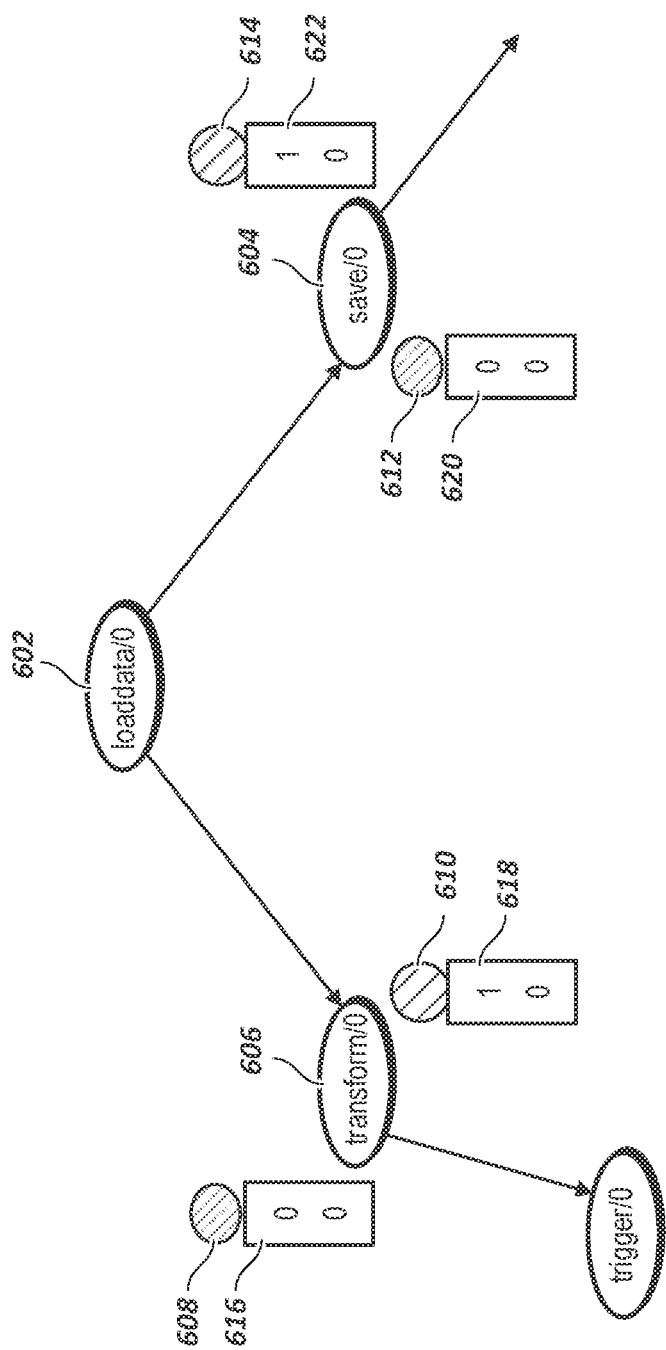

FIG. 6 is a diagram 600 of a continuing example of runtime execution of multiple instances of a workflow process. The diagram 600 includes a portion of the graph 400. For example, nodes 602, 604, and 606 correspond to the nodes 402, 404, and 406 of FIG. 4, respectively. As described above with respect to FIG. 5, two instances of the loaddata process (corresponding to the node 602) have been created. Each loaddata process instance can split into respective parallel sub processes corresponding to the node 606 (e.g., the transform process 306) and the node 604 (e.g., the save process 304). For example, a symbol 608 represents a first instance of the transform node 606 created from execution of the first instance of the workflow process and a symbol 610 represents a second instance of the transform node 606 created from execution of the second instance of the workflow process. Similarly, a symbol 612 represents a first instance of the save node 604 created from execution of the first instance of the workflow process and a symbol 614 represents a second instance of the save node 604 created from execution of the second instance of the workflow process. Identifier arrays 616 and 618 have been created for the first and second instances of the transform node 606, respectively. Similarly, identifier arrays 620 and 622 have been created for the first and second instances of the save node 604, respectively.

As described above, the identifier array for a newly-created node instance can be copied from a preceding node. If the depth of the preceding node is the same as the depth of the node of the new instance, the identifier array can be copied without modification. For example, the identifier arrays 616 and 620 for the first instance of the transform node 606 and the first instance of the save node 604, respectively, each have the same elements as the identifier array 512 for the first instance of the loaddata node 502 of FIG. 5. Similarly, the identifier arrays 618 and 622 for the second instance of the transform node 606 and the second instance of the save node 604, respectively, each have the same elements as the identifier array 514 for the second instance of the loaddata node 502. As described in other examples below, if the depth of the preceding node is less than the depth of the node of a newly-created instance, the identifier array of the preceding node can be copied for the newly-created instance and an element of the received identifier array at an index of the node of the newly-created instance can be set to a value that corresponds to a batch identifier (e.g. instance counter) of the node of the newly-created instance.

Figure 7:
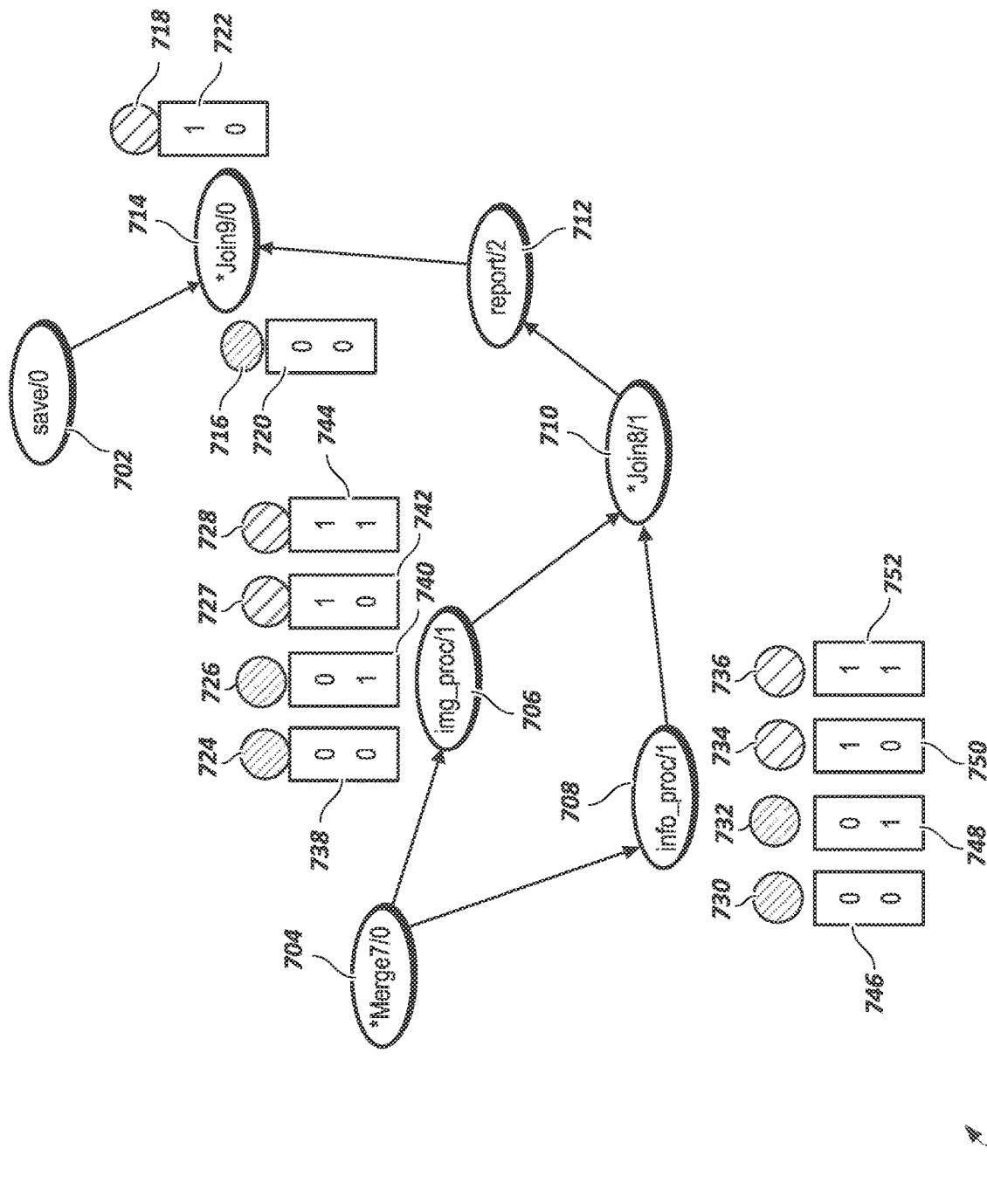

FIG. 7 is a diagram 700 of a continuing example of runtime execution of multiple instances of a workflow process. The diagram 700 includes a portion of the graph 400. For example, nodes 702, 704, 706, 708, 710, 712, and 714 correspond to the nodes 402, 410, 412, 414, 416, 418, and 410 of FIG. 4, respectively. As described above with respect to FIG. 6, two instances of the node 702 (e.g., the save node) had been initiated. A save sub process may be a less involved process than the parallel transform sub process, so execution of the two save node instances have completed. Accordingly, two instances of the node 714 (e.g., a join node) have been created (as illustrated by symbols 716 and 718, respectively). Identifier arrays 720 and 722 have been created for the first and second instances of the node 714, respectively.

As described above, for identifier arrays, if the depth of the preceding node is the same as the depth of the node of a new instance, the identifier array can be copied from the preceding node instance without modification. For example, the identifier arrays 720 and 722 for the first instance of the join node 714 and the second instance of the join node 714 have the same elements as the identifier array 620 for the first instance of the save node 604 (e.g., of FIG. 6) and the identifier array 622 for the second instance of the save node 604, respectively.

As described above, the transform process 302 can create multiple sets of data to transform. In this example, each workflow instance creates two sets of data (however, other implementations may create three, four or more sets of data for processing). Multiple instances of a particular node will then be created where each instance will process each set of data. For instance, symbols 724 and 726 represent first and second instances of the node 706 (e.g., the img_proc node) that have been created during execution of the first instance of the loaddata workflow process and hence have similar cross-hatching to symbols 508 in FIGS. 5 and 608 in FIG. 6. Symbols 727 and 728 represent third and fourth instances of the node 706 that have been created during execution of the second instance of the loaddata workflow process and hence have the same cross-hatching to symbols 510 in FIGS. 5 and 610 in FIG. 6. Symbols 730 and 732 represent first and second instances of the node 708 (e.g., the info_proc node) that have been created during execution of the first instance of the loaddata workflow process. Symbols 734 and 736 represent third and fourth instances of the node 708 that have been created during execution of the second instance of the loaddata workflow process. It should be noted that instance creation need not occur in multiples of two. If needed in alternative implementations, loaddata node 502 in FIG. 5 could have three instances generated such that if two sets of data need processing per instance of loaddata node 502, FIG. 7 would show six identifier arrays.

Identifier arrays 738, 740, 742, and 744 have been created for the first, second, third, and fourth instances of the node 706, respectively. Identifier arrays 746, 748, 750, and 752 have been created for the first, second, third, and fourth instances of the node 708, respectively.

As mentioned above, for identifier arrays, if the depth of a preceding node is less than the depth of the node of a newly-created instance, the identifier array of the preceding node instance can be copied for the newly-created instance and an element of the received identifier array at an index of the node of the newly-created instance can be set to a value that corresponds to a batch identifier of the node of the newly-created instance. For example, for the first, second, third, and fourth instances of the node 706 and the first, second, third, and fourth instances of the node 708, the depth (e.g., zero) of the node 704 (e.g., the preceding node to the nodes 706 and 708) is less than the depth (e.g., one) of the node 706 and of the node 708. Accordingly, each of the identifier arrays 738, 740, 742, 744, 746, 748, 750, and 752 can be cloned from corresponding instances of the node 704, and after cloning, an element of a respective identifier array at the element one or $1^{st}$ index (e.g., where one corresponds to the depth of the node 706 and of the node 708) can be set to a respective corresponding batch identifier for the node 706 or the node 708. For example, the identifier arrays 738, 742, 746, and 750 have a batch identifier of zero stored at the $0^{th}$ index and the identifier arrays 740, 744, 748, and 752 have a batch identifier of one stored at the $1^{st}$ index.

Referring again to the two instances of the join node 714, a workflow engine can determine, for instances of a join node, whether the join node instance has to wait for any other active instances of any other nodes, before proceeding to a next node in the graph. In particular, the workflow engine can compare element(s) of an identifier array of the join node instance to corresponding elements of identifier arrays of active instances of nodes that are graphically dependent on the join node. A node can be defined to be a graphical dependent of the join node if traversal of the graph from the node to the end of the graph requires passing through the join node. Regarding the example of FIG. 7, the nodes 706, 708, 710, and 712 are graphical dependents of the join node 714.

The workflow engine can compare identifier array elements between the join node instance and active instances of graphically dependent nodes, starting at an index zero and ending at an index equal to the depth of the join node. If all compared elements of an identifier array of an active instance of a graphically dependent node match corresponding elements of the identifier array of a join node instance, the active instance of the graphically dependent node can be determined to be a runtime dependent instance of the join node instance. Accordingly, the workflow engine can determine that the join node instance has to wait for completion of each identified runtime dependent instance before proceeding to a next node.

In the example of FIG. 7, the depth of the join node 714 is zero, so the workflow engine can compare identifier array elements just at index zero between the identifier arrays of instances of the join node 714 and identifier arrays of active instances of the node 706 and the node 708. There are currently no active instances of the node 710 or the node 712, but if there were, similar processing can be performed for those instances (e.g., as described below in the examples of FIG. 8 and FIG. 9). As an example of identifier array comparing, the first instance of the join node 714 (e.g., represented by the symbol 716) has the identifier array 720 with contents of [0,0] (e.g., with a batch identifier of zero at the index zero). The workflow engine can compare the value zero at the zero index of the identifier array 720 to respective values at index zero of the identifier arrays 738, 740, 742, and 744 of the first, second, third, and fourth instances of the node 706, where those instances are represented by the symbols 724, 726, 727, and 728, respectively. For instance, the workflow engine can determine that the identifier arrays 738 and 740 match the identifier array 720 at index zero. Accordingly, the workflow engine can determine that the first and second instances of the node 706 are runtime dependent instances of the first instance of the join node 714, as represented by symbol 716, and that the first instance of the join node 714 is to wait for completion of the first and second instances of the node 706 before proceeding to a next node. Identifier array comparing can also result in the workflow engine determining that the third and fourth instances of the node 706 are not runtime dependent instances (e.g., based on an identifier array mismatch).

Similarly, the workflow engine can compare the value zero at the zero index of the identifier array 720 to values at index zero of the identifier arrays 746, 748, 750, and 752 of the first, second, third, and fourth instances of the node 708, where those instances are represented by the symbols 730, 732, 734, and 736, respectively. For instance, the workflow engine can determine that the identifier arrays 746 and 748 match the identifier array 720 at index zero. Accordingly, the workflow engine can determine that the first and second instances of the node 708 are runtime dependent instances of the first instance of the join node 714, and that the first instance of the join node 714 is to wait for completion of the first and second instances of the node 708 before proceeding to a next node.

Similar comparisons can be made between the identifier array 722 of the second instance of the join node 714 and identifier arrays of the active instances of the node 706 and the node 708. For example, the workflow engine can determine that identifier arrays of the third and fourth instances of the node 706 and the third and fourth instances of the node 708 match the identifier array 722 at the index zero (e.g., where all compared identifier array elements have a batch identifier of one). Accordingly, the workflow engine can determine that the second instance of the join node 714 is to wait for completion of the third and fourth instances of the node 706 and the third and fourth instances of the node 708 before proceeding to a next node. Although the examples of FIG. 7 include comparison of just one element of identifier arrays, as described in other examples below, if the depth of the join node is more than zero, multiple elements of identifier arrays are compared (e.g., based on the depth of the join node). It should be noted that comparisons were only of the $0^{th}$ indexes of the various arrays because the depth of join node 714 is zero. The data stored the $1^{st}$ indexes of the various identifier arrays is not needed with respect to identifier array comparison of the instances of join node 714.

Identifier array comparing for instances of the join node 714 can be performed, as described, to determine whether processing of the workflow process can proceed past the join node 714. Such identifier array comparing can be re-executed each time a state transition occurs for a node instance during execution of the workflow process. For example, instances of the node 706 or the node 708 may complete and a state transition may occur to the node 710 (e.g., as described below for FIG. 8). Likewise, instances of the node 710 may eventually proceed to the node 712 (e.g., as described below for FIG. 9). Accordingly, identifier arrays of instances of the node 710 or the node 712 may be eventually compared to an identifier array of an instance of the join node 714. When no active dependent node instances of the join node 714 have an identifier array match to an instance of the join node 714, a state transition can occur for the instance of the join node 714 to a next node after the join node 714. The state transition past the join node 714 for an instance of the join node 714 can occur even if there are still active instances of graphically dependent nodes (e.g., nodes 706, 708, 710, 712) whose identifier arrays do not match the identifier array of the instance of the join node.

Figure 8:
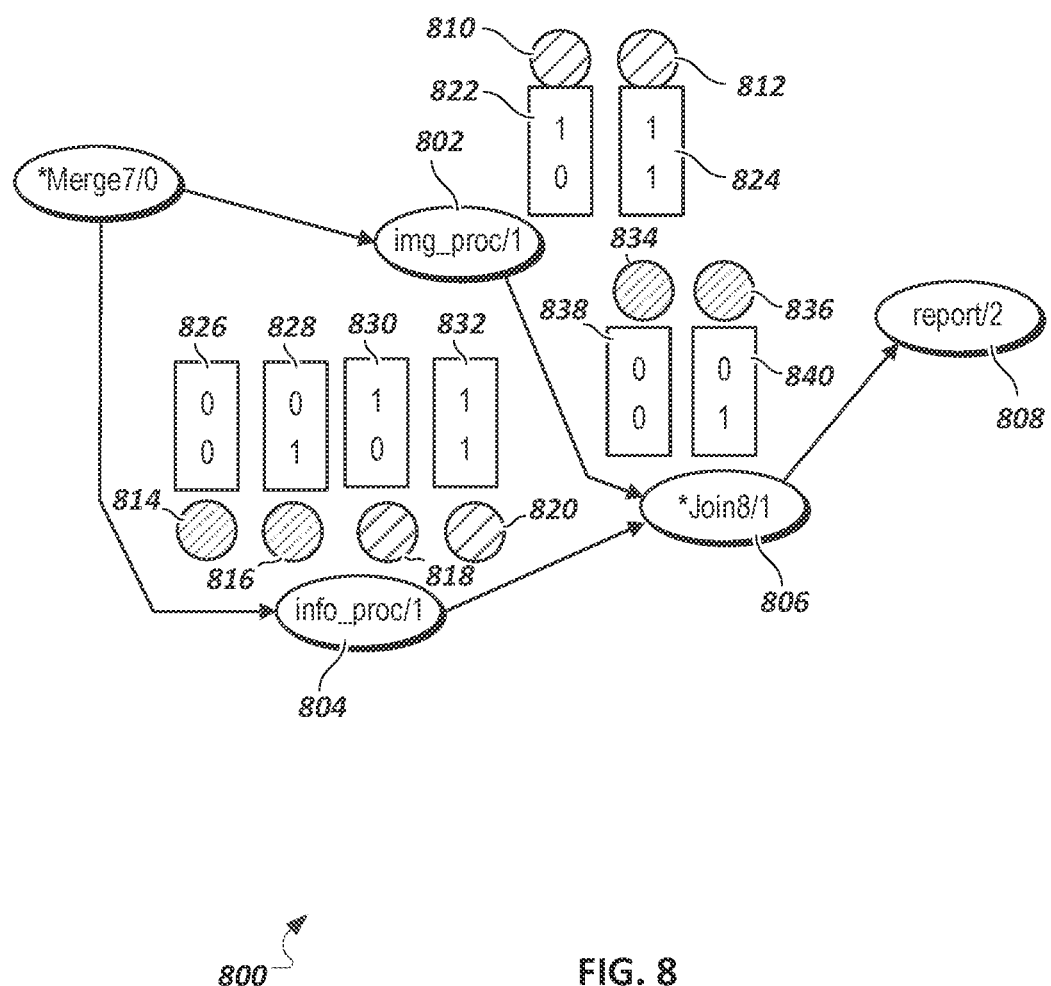

FIG. 8 is a diagram 800 of a continuing example of runtime execution of multiple instances of a workflow process. The diagram 800 includes a portion of the graph 400. For example, nodes 802, 804, 806, and 808 correspond to the nodes 412, 414, 416, and 418 of FIG. 4, respectively.

Symbols 810, 812, 814, 816, 818, and 820, and corresponding identifier arrays 822, 824, 826, 828, 830 and 832 correspond to symbols 727, 728, 730, 732, 734, and 736 and corresponding identifier arrays 742, 744, 746, 748, 750, and 752 of FIG. 7, respectively. That is, the third and fourth instances of the node 802 (e.g., the img_proc node) are still executing, as are the first, second, third, and fourth instances of the node 804 (e.g., the info_proc node). The first and second instances of the node 802 (the img_proc node) have finished. Accordingly, first and second instances of a join node 806 (e.g., a second join node) have been instantiated, as illustrated by symbols 834 and 836. Identifier arrays 838 and 840 have been created for the first and second instances of the join node 806, respectively.

In the example of FIG. 8, the depth of the join node 806 is one, so the workflow engine can compare identifier array elements at index zero and at index one between the identifier arrays of instances of the join node 806 and identifier arrays of active instances of the node 802 and the node 804. For example, the first instance of the join node 806 (e.g., represented by the symbol 834) has the identifier array 838 with contents of [0,0] (e.g., with a batch identifier of zero at indexes zero and one). The workflow engine can compare the value zero at the zero index of the identifier array 838 and the value zero at the one index of the identifier array 838 to respective corresponding values at indexes zero and one of the identifier arrays 822 and 824 of the first and second instances of the node 802 and the identifier arrays 826, 828, 830, and 832 of the first, second, third, and fourth instances of the node 804, respectively. A similar comparison can be made for the identifier array 840 of the second instance of the join node 806 (e.g., with the identifier array 840 including a batch identifier value of one at index one).

The workflow engine can determine that the identifier array 838 of the first instance of the join node 806 matches the identifier array 826 of the first instance of the node 804 at indexes zero and one. Accordingly, the workflow engine can determine that the first instance of the node 804 is a runtime dependent instance of the first instance of the join node 806, and that the first instance of the join node 806 is to wait for completion of the first instance of the node 804 before proceeding to a next node. Similarly, the workflow engine can determine that the identifier array 838 of the second instance of the join node 806 matches the identifier array 828 of the second instance of the node 804 at indexes zero and one. Accordingly, the workflow engine can determine that the second instance of the node 804 is a runtime dependent instance of the second instance of the join node 806, and that the second instance of the join node 806 is to wait for completion of the second instance of the node 804 before proceeding to a next node. Similar comparisons and determinations can be made after the third and fourth instances of the node 802 or the first, second, third, and fourth instances of the node 804 finish processing and another instance of the join node 806 is created and finishes processing.

Figure 9:
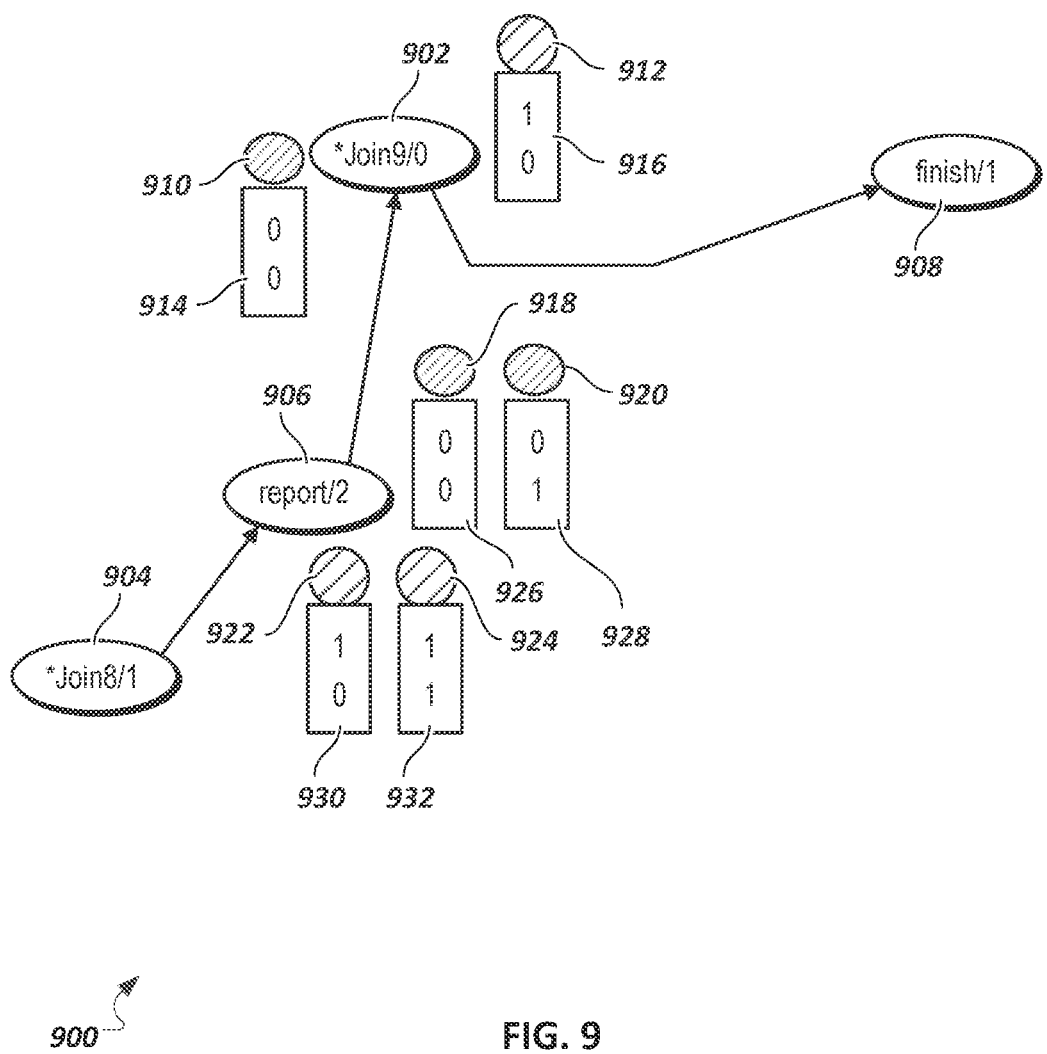

FIG. 9 is a diagram 900 of a continuing example of runtime execution of multiple instances of a workflow process. The diagram 900 includes a portion of the graph 400. For example, nodes 902, 904, 906, and 908 correspond to the nodes 420, 416, 418, and 422 of FIG. 4, respectively.

Symbols 910 and 912 and corresponding identifier arrays 914 and 916 correspond to symbols 716 and 718 and corresponding identifier arrays 720 and 722 of FIG. 7, respectively. Symbols 910 and 912 represent instances of join9 that are waiting for other branch(es). They have identifier arrays 914 and 916, respectively.

Symbols 918 and 920 represent first and second instances of the node 906 (e.g., the report node) that correspond to the first and second batches created by the first instance of the loaddata sub process. Similarly, symbols 922 and 924 represent third and fourth instances of the node 906 that correspond to the first and second batches created by the second instance of the loaddata sub process. Identifier arrays 926, 928, 930, and 932 correspond to the node instances corresponding to the symbols 918, 920, 922, and 924, respectively.

The workflow engine can check again to determine if the first and/or second instances of the join node 902 have to wait for any other active instances. The workflow engine can perform a check for the instances of the join node 902 (and other active join node instances) whenever any node change its state (e.g., inactive to active, active to finished). As described above, the depth of the join node 902 is zero, so the workflow engine can compare the zero value at the zero index of the identifier array 914 of the first instance of the join node 902 to elements at index zero of identifier arrays of active instances of nodes that are graphically dependent on the join node 902. For example, the workflow engine can determine that the identifier array 926 of the first instance of the node 906 and the identifier array 928 of the second instance of the node 906 match the identifier array 914 at index zero. In a similar fashion, the workflow engine can determine that the identifier array 930 of the third instance of the node 906 and the identifier array 932 of the fourth instance of the node 906 match the identifier array 916 of the second instance of the join node 902 at index zero. Accordingly, the workflow engine can determine that the first instance of the join node 902 is to wait for completion of the first and second instances of the node 906 and the second instance of the join node is to wait for completion of the third and fourth instances of the node 906.

Figure 10:
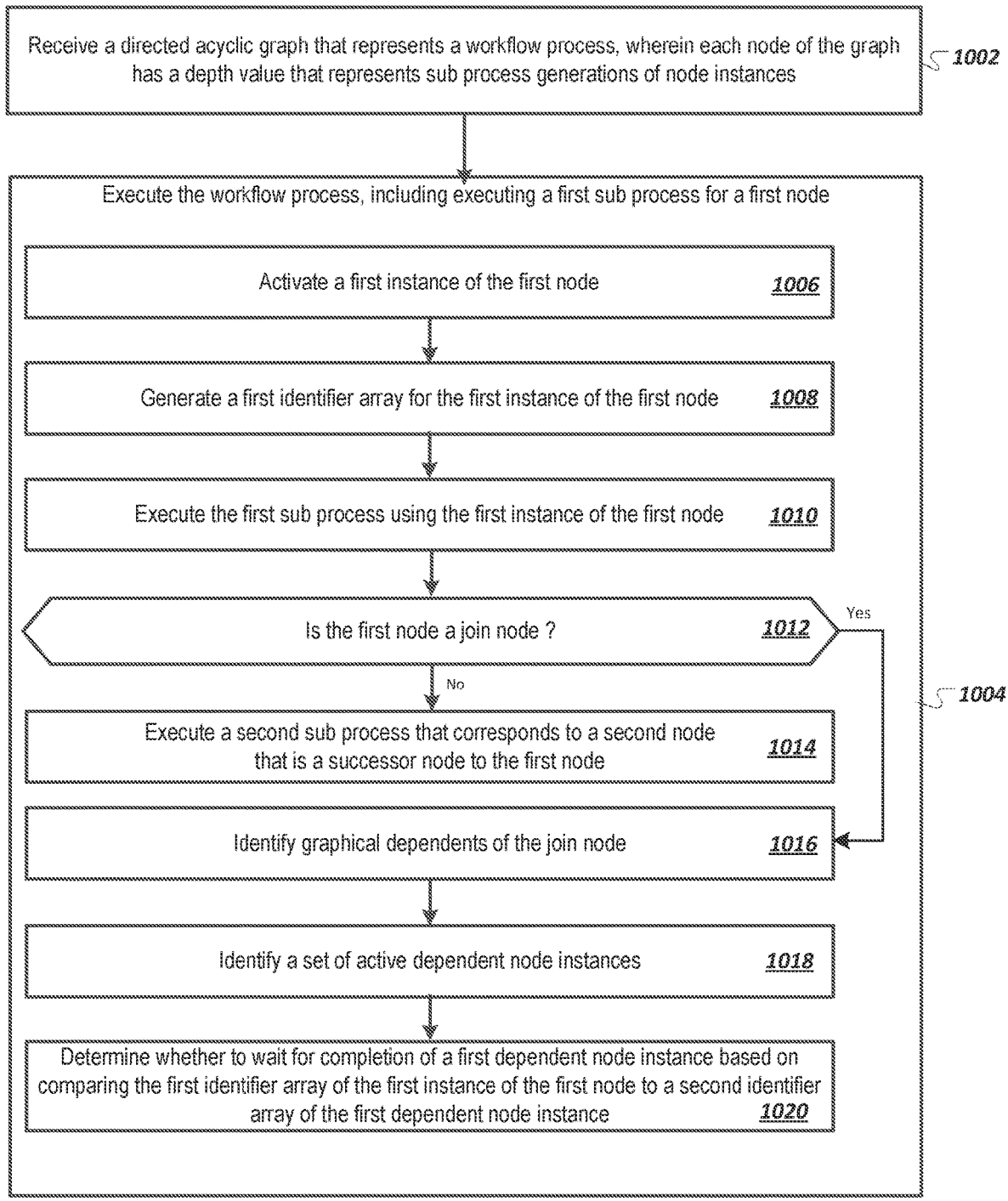
FIG. 10 is a flowchart of an example method for concurrent duplicated sub process control in a workflow engine.

FIG. 10 is a flowchart of an example method for concurrent duplicated sub process control in a workflow engine. It will be understood that method 1000 and related methods may be performed, for example, by any suitable system, environment, software, and hardware, or a combination of systems, environments, software, and hardware, as appropriate. For example, one or more of a client, a server, or other computing device can be used to execute method 1000 and related methods and obtain any data from the memory of a client, the server, or the other computing device. In some implementations, the method 1000 and related methods are executed by one or more components of the system 100 described above with respect to FIG. 1. For example, the method 1000 and related methods can be executed by the server 102 of FIG. 1.

At 1002, a DAG is received that represents a workflow process. The DAG includes nodes that each graphically represent a sub process of the workflow process. Each node has a depth value with node depth values representing sub process generations of instances of respective nodes. A depth of a succeeding first node that is connected in the DAG to a preceding second node is one greater than a depth of the preceding second node when the preceding second node is directly connected to at least one other succeeding node or the preceding second node is a system-generated node that represents a merge or iteration operation of the workflow process. Execution of the workflow process includes multiple, parallel instantiations of at least one sub process. An instance of a given node corresponds to a respective instantiation of a sub process corresponding to the given node.

At 1004, the workflow process is executed which includes executing a first sub process for a first node. Executing the first sub process for the first node can include various steps.

At 1006, a first instance of the first node is activated.

At 1008, a first identifier array is generated for the first instance of the first node. The first identifier array for the first instance of the first node can be an array of batch identifiers that each indicate a relative creation time of one or more node instances. The first identifier array includes a batch identifier for a first batch corresponding to the first instance of the first node at a first index of the first identifier array corresponding to the depth of the first node. The first identifier array can include, at other indices, other depth values of other nodes that precede the first node in the DAG.

At 1010, the first sub process is executed using the first instance of the first node.

At 1012, after executing the first sub process, a determination is made as to whether the first node is a join node. The first node is a join node if the first node has multiple direct predecessor nodes in the DAG.

At 1014, in response to determining that the first node is not a join node, a second node that is a successor node to the first node is identified and a second sub process of the workflow process that corresponds to the second node is executed.

At 1016, in response to determining that the first node is a join node, dependent nodes in the DAG that are graphical dependents of the join node are identified. A given node is a graphical dependent node of the join node if traversal of the DAG from the given node to an end of the DAG passes through the join node.

At 1018, a set of active dependent node instances of the dependent nodes are identified.

At 1020, a determination is made as to whether to wait for completion of a first dependent node instance based on comparing the first identifier array of the first instance of the first node to a second identifier array of the first dependent node instance. For example, a determination can be made to wait for completion of the first dependent node instance before executing the second sub process of the workflow process that corresponds to a second node that is a successor node to the first node.

Comparing the first identifier array of the first instance of the first node to the second identifier array of the first dependent node instance can include comparing elements of the second identifier array of the first dependent node instance to corresponding elements of the first identifier array of the first instance of the first node up to the first index of the first identifier array that corresponds to the depth of the first node. Determining whether to wait for completion of the first dependent node instance can include: determining to wait for the first dependent node instance if all compared elements of the second identifier array match corresponding compared elements of the first identifier array; and determining to not wait for the first dependent node instance if not all compared elements of the second identifier array match corresponding compared elements of the first identifier array. The first dependent node instance can be determined to be a runtime dependency of the first instance of the first node based on all compared elements of the second identifier array matching corresponding compared elements of the first identifier array.

Similar processing as performed for the first dependent node instance can be performed for other dependent node instances in the set of active dependent node instances. A determination can be made to execute the second sub process of the workflow process corresponding to the second node in response to determining that none of the set of active dependent node instances are runtime dependencies of the first instance of the first node.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
   receiving a directed acyclic graph (DAG) that represents a workflow process, wherein the DAG includes nodes that each graphically represent a sub process of the workflow process, wherein each node has a depth value, wherein node depth values represent sub process generations of instances of respective nodes, wherein a depth of a succeeding first node that is connected in the DAG to a preceding second node is one greater than a depth of the preceding second node when the preceding second node is directly connected to at least one other succeeding node or the preceding second node is a system-generated node that represents a merge or iteration operation of the workflow process, wherein execution of the workflow process includes multiple, parallel instantiations of at least one sub process, and wherein an instance of a given node corresponds to a respective instantiation of a sub process corresponding to the given node; and
   executing the workflow process, including executing a first sub process for a first node, wherein executing the first sub process for the first node comprises:
   activating a first instance of the first node;
   generating a first identifier array for the first instance of the first node, wherein the first identifier array for the first instance of the first node comprises an array of batch identifiers that each indicate a relative creation time of one or more node instances, and wherein the first identifier array includes a batch identifier for a first batch corresponding to the first instance of the first node at a first index of the first identifier array corresponding to the depth of the first node;
   executing the first sub process using the first instance of the first node;
   after executing the first sub process, determining whether the first node is a join node, wherein the first node is a join node if the first node has multiple direct predecessor nodes in the DAG;
   in response to determining that the first node is not a join node, identifying a second node that is a successor node to the first node and executing a second sub process of the workflow process that corresponds to the second node;
   in response to determining that the first node is a join node:
   identifying dependent nodes in the DAG that are graphical dependents of the join node, wherein a given node is a graphical dependent node of the join node if traversal of the DAG from the given node to an end of the DAG passes through the join node;
   identifying a set of active dependent node instances of the dependent nodes; and
   determining whether to wait for completion of a first dependent node instance based on comparing the first identifier array of the first instance of the first node to a second identifier array of the first dependent node instance.

2. The computer-implemented method of claim 1, wherein comparing the first identifier array of the first instance of the first node to the second identifier array of the first dependent node instance comprises comparing elements of the second identifier array of the first dependent node instance to corresponding elements of the first identifier array of the first instance of the first node up to the first index of the first identifier array that corresponds to the depth of the first node.

3. The computer-implemented method of claim 2, wherein determining whether to wait for completion of the first dependent node instance comprises:
   determining to wait for the first dependent node instance if all compared elements of the second identifier array match corresponding compared elements of the first identifier array; and
   determining to not wait for the first dependent node instance if not all compared elements of the second identifier array match corresponding compared elements of the first identifier array.

4. The computer-implemented method of claim 2, wherein the first dependent node instance is determined to be a runtime dependency of the first instance of the first node based on all compared elements of the second identifier array matching corresponding compared elements of the first identifier array.

5. The computer-implemented method of claim 4, further comprising determining to execute the second sub process of the workflow process corresponding to the second node based on determining that none of the set of active dependent node instances are runtime dependencies of the first instance of the first node.

6. The computer-implemented method of claim 1, wherein a same batch identifier is assigned to a third node instance and a fourth node instance that were each created from a same predecessor node.

7. The computer-implemented method of claim 1, wherein a batch identifier of an earlier-created node instance has a smaller batch identifier value than a later-created node instance.

8. A system comprising:
one or more computers; and
a computer-readable medium coupled to the one or more computers having instructions stored thereon which, when executed by the one or more computers, cause the one or more computers to perform operations comprising:
receiving a directed acyclic graph (DAG) that represents a workflow process, wherein the DAG includes nodes that each graphically represent a sub process of the workflow process, wherein each node has a depth value, wherein node depth values represent sub process generations of instances of respective nodes, wherein a depth of a succeeding first node that is connected in the DAG to a preceding second node is one greater than a depth of the preceding second node when the preceding second node is directly connected to at least one other succeeding node or the preceding second node is a system-generated node that represents a merge or iteration operation of the workflow process, wherein execution of the workflow process includes multiple, parallel instantiations of at least one sub process, and wherein an instance of a given node corresponds to a respective instantiation of a sub process corresponding to the given node; and
executing the workflow process, including executing a first sub process for a first node, wherein executing the first sub process for the first node comprises:
activating a first instance of the first node;
generating a first identifier array for the first instance of the first node, wherein the first identifier array for the first instance of the first node comprises an array of batch identifiers that each indicate a relative creation time of one or more node instances, and wherein the first identifier array includes a batch identifier for a first batch corresponding to the first instance of the first node at a first index of the first identifier array corresponding to the depth of the first node;
executing the first sub process using the first instance of the first node;
after executing the first sub process, determining whether the first node is a join node, wherein the first node is a join node if the first node has multiple direct predecessor nodes in the DAG;
in response to determining that the first node is not a join node, identifying a second node that is a successor node to the first node and executing a second sub process of the workflow process that corresponds to the second node;
in response to determining that the first node is a join node:
identifying dependent nodes in the DAG that are graphical dependents of the join node, wherein a given node is a graphical dependent node of the join node if traversal of the DAG from the given node to an end of the DAG passes through the join node;
identifying a set of active dependent node instances of the dependent nodes; and
determining whether to wait for completion of a first dependent node instance based on comparing the first identifier array of the first instance of the first node to a second identifier array of the first dependent node instance.

9. The system of claim 8, wherein comparing the first identifier array of the first instance of the first node to the second identifier array of the first dependent node instance comprises comparing elements of the second identifier array of the first dependent node instance to corresponding elements of the first identifier array of the first instance of the first node up to the first index of the first identifier array that corresponds to the depth of the first node.

10. The system of claim 9, wherein determining whether to wait for completion of the first dependent node instance comprises:
determining to wait for the first dependent node instance if all compared elements of the second identifier array match corresponding compared elements of the first identifier array; and
determining to not wait for the first dependent node instance if not all compared elements of the second identifier array match corresponding compared elements of the first identifier array.

11. The system of claim 9, wherein the first dependent node instance is determined to be a runtime dependency of the first instance of the first node based on all compared elements of the second identifier array matching corresponding compared elements of the first identifier array.

12. The system of claim 11, further comprising determining to execute the second sub process of the workflow process corresponding to the second node based on determining that none of the set of active dependent node instances are runtime dependencies of the first instance of the first node.

13. The system of claim 8, wherein a same batch identifier is assigned to a third node instance and a fourth node instance that were each created from a same predecessor node.

14. The system of claim 8, wherein a batch identifier of an earlier-created node instance has a smaller batch identifier value than a later-created node instance.

15. A computer program product encoded on a non-transitory storage medium, the product comprising non-transitory, computer readable instructions for causing one or more processors to perform operations comprising:
receiving a directed acyclic graph (DAG) that represents a workflow process, wherein the DAG includes nodes that each graphically represent a sub process of the workflow process, wherein each node has a depth value, wherein node depth values represent sub process generations of instances of respective nodes, wherein a depth of a succeeding first node that is connected in the DAG to a preceding second node is one greater than a depth of the preceding second node when the preceding second node is directly connected to at least one other succeeding node or the preceding second node is a system-generated node that represents a merge or iteration operation of the workflow process, wherein execution of the workflow process includes multiple, parallel instantiations of at least one sub process, and wherein an instance of a given node corresponds to a respective instantiation of a sub process corresponding to the given node; and executing the workflow process, including executing a first sub process for a first node, wherein executing the first sub process for the first node comprises:

activating a first instance of the first node;

generating a first identifier array for the first instance of the first node, wherein the first identifier array for the first instance of the first node comprises an array of batch identifiers that each indicate a relative creation time of one or more node instances, and wherein the first identifier array includes a batch identifier for a first batch corresponding to the first instance of the first node at a first index of the first identifier array corresponding to the depth of the first node;

executing the first sub process using the first instance of the first node;

after executing the first sub process, determining whether the first node is a join node, wherein the first node is a join node if the first node has multiple direct predecessor nodes in the DAG;

in response to determining that the first node is not a join node, identifying a second node that is a successor node to the first node and executing a second sub process of the workflow process that corresponds to the second node;

in response to determining that the first node is a join node:

identifying dependent nodes in the DAG that are graphical dependents of the join node, wherein a given node is a graphical dependent node of the join node if traversal of the DAG from the given node to an end of the DAG passes through the join node;

identifying a set of active dependent node instances of the dependent nodes; and determining whether to wait for completion of a first dependent node instance based on comparing the first identifier array of the first instance of the first node to a second identifier array of the first dependent node instance.

16. The computer program product of claim 15, wherein comparing the first identifier array of the first instance of the first node to the second identifier array of the first dependent node instance comprises comparing elements of the second identifier array of the first dependent node instance to corresponding elements of the first identifier array of the first instance of the first node up to the first index of the first identifier array that corresponds to the depth of the first node.

17. The computer program product of claim 16, wherein determining whether to wait for completion of the first dependent node instance comprises:

determining to wait for the first dependent node instance if all compared elements of the second identifier array match corresponding compared elements of the first identifier array; and determining to not wait for the first dependent node instance if not all compared elements of the second identifier array match corresponding compared elements of the first identifier array.

18. The computer program product of claim 16, wherein the first dependent node instance is determined to be a runtime dependency of the first instance of the first node based on all compared elements of the second identifier array matching corresponding compared elements of the first identifier array.

19. The computer program product of claim 15, further comprising determining to execute the second sub process of the workflow process corresponding to the second node based on determining that none of the set of active dependent node instances are runtime dependencies of the first instance of the first node.

20. The computer program product of claim 15, wherein a same batch identifier is assigned to a third node instance and a fourth node instance that were each created from a same predecessor node.

* * * * *